# 3,458,575
(N-NITROSOAMINO)-GUANIDINES

Bola Vithal Shetty, Rochester, and Telfer L. Thomas, Pittsford, N.Y., assignors to Wallace & Tiernan Inc., East Orange, N.J., a corporation of Delaware
No Drawing. Filed Mar. 16, 1966, Ser. No. 534,671
Int. Cl. C07c *133/10*
U.S. Cl. 260—564           5 Claims

ABSTRACT OF THE DISCLOSURE

Hypotensive agents are compounds of the formula:

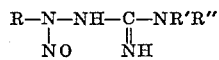

where R is a terpenyl group (terpenyl being defined as the radical formed by the removal of a hydrogen atom from a terpene), R' is a hydrogen or lower alkyl such as a methyl or ethyl, and R" is a hydrogen or a lower alkyl such as a methyl or ethyl. Particularly suitable hypotensive agents are (N-nitrosobornylamino)-guanidine, (N-nitrosofenchylamino)-guanidine, and (N-nitroso-2,3,3-trimethyl-2-nor-camphanylamino)-guanidine. Also included are the therapeutically acceptable salts thereof, such as the hydrochloride, phosphate, and maleate addition salts.

---

The invention relates to (N-nitrosoamino)-guanidines.

An object of the invention is to provide a novel and reliable hypotensive agent.

We have found that the (N-nitrosoterpenylamino)-guanidines, such as (N-nitrosobornylamino)-guanidine, (N-nitrosofenchylamino)-guanidine, (N-nitroso-2,3,3,-trimethyl-2-norcamphanylamino)-guanidine are effective hypotensive agents and are nontoxic in amounts far above the therapeutically effective dose amount.

Suitable compounds include those represented by the following formula:

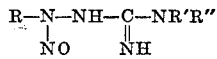

where R is a terpenyl group (terpenyl being defined as the radical formed by the removal of a hydrogen atom from a terpene), R' is a hydrogen or lower alkyl such as a methyl or ethyl, and R" is a hydrogen or a lower alkyl such as a methyl or ethyl. Also included are the therapeutically acceptable salts thereof, such as the hydrochloride, phosphate, and maleate addition salts.

The (N-nitrosobornylamino)-guanidine was pharmacologically tested on mice, cats and dogs in large enough numbers to be statistically significant. In all cases the compound was an effective hypotensive agent.

The other (nitrosoterpenylamino) guanidine compounds have substantially the same hypotensive action and low toxicity as the bornyl compound.

Following are details on the pharmacology tests run on (N-nitrosobornylamino)-guanidine:

It was administered over the dose range from 1 to 10 mg./kg. intravenously in propylene glycol and from 1 to 25 mg./kg. orally in clearjel suspension. The vehicles had a negligible effect on the responses measured. Blood pressure in anesthetized dogs w monitored continuously with a pressure transducer in either the femoral or carotid artery.

The data indicated that (N-nitrosobornylamino)-guanidine is a relatively potent, nontoxic hypotensive agent. The ratio of LD–50 to highest nonsymptomatic dose is about 10 to 1. The symptoms characteristic of the low doses are the same as those produced by guanethidine (Fielden, R. and Green, A. L., Brit. J. Pharmacol. 24, 408–417, 1965), suggesting a common mechanism of action.

The blood pressure records demonstrate that (N-nitrosobornylamino)-guanidine has a rapid onset of action by either route, the drop in blood pressure beginning within minutes and reaching its maximum by one half hour. Systolic, diastolic and pulse pressure are all decreased. A graded response is obtained over the dose range from 1 to 10 mg./kg. by either route. Higher oral doses (up to 25 mg./kg.) do not produce any further decrease. Doses above 10 mg./kg. were not tried intravenously. Heart rate seems little affected and the changes are not associated systematically with changes in blood pressure or doses of the compound. The hypotensive response was of greater duration when the compound was administered orally than intravenously, no decrease in activity being apparent over the 6 hour observation period.

The following tables give further information on tests on (N-nitrosobornylamino)-guanidine:

TABLE I.—SYMPTOMATOLOGY AND ACUTE TOXICITY (MICE)

| Route | LD–50, mg./kg. | Highest Non-symptomatic Dose, mg./kg. | Symptoms at Low Doses |
|---|---|---|---|
| P.O | 610 | 56.2 | Ptosis. |
| I.P | 237 | 31.6 | Ptosis, tremors. |

P.O.=Oral; I.P.=Intraperitoneal.

The following notes apply to Tables II–V.

(1)

Where an animal was given more than one dose, the doses are numbered sequentially (I, II, III) with the time interval after the previous dose in parentheses.

(2)

BP=blood pressure, mm. Hg, systolic/diastolic.
MAP=mean arterial pressure.
PP=pulse pressure, systolic minus diastolic.
HR=heart rate, beats per minute.
RR=respiration rate, breaths per minute.

TABLE II.—CARDIOVASCULAR RESPONSE IN DOGS HAVING THE COMPOUND ADMINISTERED INTRAVENOUSLY (IN PROPYLENE GLYCOL)

(I) 1 mg./kg.

| | Control | 2 min. | 11 min. | 25 min. | 100 min. |
|---|---|---|---|---|---|
| BP | 160/110 | 110/70 | 140/110 | 130/110 | 160/120 |
| MAP | 135 | 85 | 110 | 125 | 135 |
| PP | 50 | 40 | 30 | 20 | 40 |
| HR | 75 | 175 | 175 | 165 | 86 |

(II) 1 mg./kg. (188 min. after I)

| | Control | 10 min. | 50 min. |
|---|---|---|---|
| BP | 160/120 | 145/100 | 160/110 |
| MAP | 135 | 125 | 145 |
| PP | 40 | 45 | 50 |
| HR | 73 | 65 | 45 |

(III) 5 mg./kg. (56 min. after II)

| | Control | 12 min. |
|---|---|---|
| BP | 160/110 | 160/120 |
| MAP | 145 | 130 |
| PP | 50 | 40 |
| HR | 45 | 150 |

TABLE III.—CARDIOVASCULAR RESPONSE IN DOGS HAVING THE COMPOUND ADMINISTERED INTRAVENOUSLY (IN PROPYLENE GLYCOL)

(I) 1 mg./kg.

|     | Control | 1 min. | 5 min. | 10 min. | 20 min. |
|-----|---------|--------|--------|---------|---------|
| BP  | 160/110 | 100/70 | 135/100 | 125/100 | 115/85 |
| MAP | 140     | 90     | 115    | 110     | 100    |
| PP  | 50      | 30     | 35     | 25      | 30     |
| HR  | 155     | 190    | 170    | 165     | 165    |

(II) 2.5 mg./kg. (117 min. after I)

|     | Control | 1 min. | 5 min. | 15 min. | 30 min. | 45 min. |
|-----|---------|--------|--------|---------|---------|---------|
| BP  | 150/110 | 85/50  | 100/70 | 90/70   | 100/70  | 120/90  |
| MAP | 130     | 70     | 85     | 85      | 90      | 100     |
| PP  | 40      | 35     | 30     | 20      | 30      | 30      |
| HR  | 140     | 180    | 180    | 165     | 150     | 150     |

TABLE III—Continued (III) 5 mg./kg. (113 min. after II)

|     | Control | 2 min. | 7 min. | 10–20 min. | 40 min. | 60 min. |
|-----|---------|--------|--------|------------|---------|---------|
| BP  | 125/100 | 80/40  | 85/55  | 75/50      | 80/60   | 100/70  |
| MAP | 110     | 60     | 70     | 70         | 75      | 80      |
| PP  | 25      | 40     | 30     | 25         | 20      | 30      |
| HR  | 150     | 165    | 150    | 150        | 145     | 145     |

10 mg./kg.

|     | Control | 5 min. | 15 min. | 45 min. | 2¼ hrs. | 4 hrs. |
|-----|---------|--------|---------|---------|---------|--------|
| BP  | 180/140 | 70/40  | 70/50   | 90/60   | 120/95  | 140/120 |
| MAP | 160     | 50     | 60      | 70      | 105     | 130    |
| PP  | 40      | 30     | 20      | 30      | 25      | 20     |
| HR  | 100     | 115    | 100     | 130     | 119     | 110    |
| RR  | 8       | 8      | 11      | 11      | 9       | 8      |

TABLE IV.—CARDIOVASCULAR RESPONSE IN DOGS HAVING THE COMPOUND ADMINISTERED ORALLY (IN CLEARJEL)

1 mg./kg.

|     | Control | 4 min. | 29 min. | 57 min. | 2 hrs. | 3 hrs. | 4 hrs. | 6 hrs., 20 min. |
|-----|---------|--------|---------|---------|--------|--------|--------|-----------------|
| BP  | 154/114 | 156/117 | 140/110 | 127/107 | 133/115 | 138/118 | 117/98 | 125/105 |
| MAP | 127     | 130    | 120     | 114     | 121    | 125    | 125    | 112 |
| PP  | 40      | 39     | 30      | 20      | 18     | 20     | 19     | 20 |
| HR  | 138     | 142    | 135     | 140     | 138    | 135    | 125    | 125 |

5 mg./kg.

|     | Control | 10 min. | 21 min. | 51 min. | 2 hrs. | 3 hrs. | 4 hrs. | 5 hrs. | 6 hrs. |
|-----|---------|---------|---------|---------|--------|--------|--------|--------|--------|
| BP  | 160/115 | 125/99  | 112/82  | 106/78  | 102/70 | 101/72 | 100/70 | 98/67  | 95/63  |
| MAP | 140     | 108     | 92      | 87      | 81     | 82     | 80     | 77     | 74     |
| PP  | 45      | 26      | 30      | 28      | 32     | 29     | 30     | 31     | 32     |
| HR  | 125     | 124     | 115     | 118     | 105    | 95     | 90     | 85     | 83     |

10 mg./kg.

|     | Control | 5 min. | 28 min. | 59 min. | 2 hrs. | 3 hrs. | 4 hrs. | 5 hrs. |
|-----|---------|--------|---------|---------|--------|--------|--------|--------|
| BP  | 122/85  | 106/70 | 82/32   | 71/34   | 70/34  | 76/42  | 72/49  | 67/45  |
| MAP | 97      | 82     | 49      | 46      | 46     | 53     | 57     | 52     |
| PP  | 37      | 36     | 50      | 37      | 36     | 34     | 23     | 22     |
| HR  | 150     | 148    | 132     | 128     | 120    | 120    | 108    | 116    |

20 mg./kg.

|     | Control | 5 min. | 36 min. | 59 min. | 2 hrs. | 3 hrs. | 4 hrs. |
|-----|---------|--------|---------|---------|--------|--------|--------|
| BP  | 150/110 | 135/100 | 79/44  | 75/39   | 87/46  | 84/55  | 85/45  |
| MAP | 123     | 112    | 56      | 51      | 60     | 65     | 58     |
| PP  | 40      | 35     | 35      | 36      | 41     | 29     | 40     |
| HR  | 160     | 165    | 146     | 151     | 175    | 165    | 168    |

25 mg./kg.

|     | Control | 5 min. | 15 min. | 45 min. | 135 min. | 4 hrs. | 5 hrs. |
|-----|---------|--------|---------|---------|----------|--------|--------|
| BP  | 180/140 | 90/65  | 80/55   | 70/50   | 85/60    | 100/80 | 105/85 |
| MAP | 155     | 80     | 65      | 60      | 75       | 80     | 90     |
| PP  | 40      | 25     | 25      | 20      | 25       | 20     | 20     |
| HR  | 140     | 175    | 165     | 185     | 160      | 155    | 150    |
| RR  | 4–5     | 10     | 9       | 11      | 10       | 14     | 15     |

TABLE V.—CARDIOVASCULAR RESPONSE IN CAT HAVING THE COMPOUND ADMINISTERED ORALLY (IN CLEARJEL)

15 mg./kg.

|     | Control | 10 min. | 15 min. | 40 min. | 1¼ hrs. | 2¼ hrs. | 3 hrs. | 3½ hrs. |
|-----|---------|---------|---------|---------|---------|---------|--------|---------|
| BP  | 115/75  | 60/45   | 50/35   | 45/30   | 50/35   | 60/40   | 65/45  | 70/45   |
| MAP | 90      | 50      | 40      | 35      | 40      | 50      | 55     | 60      |
| PP  | 40      | 15      | 15      | 15      | 15      | 20      | 20     | 25      |
| HR  | 180     | 180     | 175     | 160     | 160     | 160     | 150    | 150     |
| RR  | 8       | 8       | 10      | 10      | 10      | 10      | 10     | 10      |

25 mg./kg.

|     | Control | 5 min. | 15 min. | 30 min. | 45 min. | 2 hrs. | 4 hrs. | 5 hrs. |
|-----|---------|--------|---------|---------|---------|--------|--------|--------|
| BP  | 140/110 | 75/55  | 70/50   | 65/45   | 70/50   | 80/60  | 100/75 | 120/90 |
| MAP | 130     | 65     | 60      | 55      | 60      | 70     | 85     | 100    |
| PP  | 30      | 20     | 20      | 20      | 20      | 20     | 25     | 30     |
| HR  | 225     | 185    | 175     | 180     | 180     | 170    | 150    | 140    |

Summary

Compound (N-nitrosobornylamino)-guanidine is an effective hypotensive agent with rapid onset and long duration of action. It is potent, being effective by the oral route in the dose range from 1 to 10 mg./kg., and relatively safe, the LD–50 being a factor of about 10× above the lowest symptomatic dose.

The following examples illustrate the preparation of the compounds of this invention:

Example I

Preparation of (N-nitrosobornylamino)-guanidine (a) Bornylaminoguanidine hydrochloride.—41 gm. of bornylhydrazine hydrochloride (M.W. 204.78) was dissolved in 400 ml. of water. After heating to ca. 60° C. a 25 percent solution of sodium hydroxide in water was added until a slight turbidity was produced and the pH of the solution was 8–9. 20 gm. of cyanamide in 50 ml. of water was added at 60–70° C. over 20 minutes. The cloudy liquid gradually cleared during addition. It was stirred an additional 20 minutes, then cooled in an ice bath with stirring. Then it was left in the refrigerator over night. It was filtered, reslurried with a little water to a thick paste, filtered and washed with a little water, and dried in vacuo over phosphorus pentoxide.

Wgt.=20.5 gm., M.W.=235–250° C.

Recrystallization from n-butanol (3 ml./gm.) gave a pure product melting at 251–255° C. This product was the intermediate compound bornylaminoguanidine hydrochloride.

(b) (N-nitrosobornylamino)-guanidine.—8.9 gm. of bornylaminoguanidine hydrochloride (M.W. 246.78) in 150 ml. of water was cooled to 4° C. and 10.0 ml. of hydrochloric acid was added. To this was slowly added 3.0 gm. of sodium nitrite in 25 ml. of water. It was stirred 20 minutes and poured into 350 ml. of cold water. Most of the material dissolved. Filtered off a small amount of insoluble matter and neutralized the filtrate with dilute sodium hydroxide solution. It was filtered and washed with water, and dried in vacuo over phosphorus pentoxide.

Wgt.=6.8 gm., M.W. 149–151° C.

In addition to the nitrosoterpenylamino guanidines described above, other N-nitrosoamino guanidines can be made in a similar manner to that given in the above working example, as will be apparent to those skilled in the art. Thus there may be made compounds having the general structure shown below:

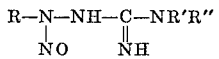

where R is an alkyl, substituted alkyl, alicyclic including cycloalkyl, and substituted alicyclic, aralkyl including phenylalkyl, heterocyclic and substituted heterocyclic. R′ and R″ may be the same as above indicated for R.

Compounds of the above formula are all useful in studying hypotensive action and in research on the comparative stability of nitroso compounds. Studies are continuing on these types of compounds, but in general R is controlling for hypotensive action and so far we have not found any compounds of this type which are remarkable hypotensive agents where R is other than a terpenyl group. R′ and R″ can be varied widely without destroying hypotensive effect and specifically can be hydrogen, or lower alkyl such as methyl, ethyl and propyl, although the other members, as indicated above, are not precluded.

The above compounds are also useful in making the corresponding pseudo oxatriazoles, which are compounds having high physiological absorption characteristics.

We claim:
1. A compound of the formula

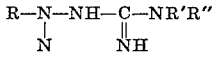

or the therapeutically acceptable salts thereof where R is bornyl, fenchyl or 2,3,3-trimethyl-2-norcamphanyl, and R′ and R″ are hydrogen or lower alkyl.

2. The compound of claim 1 wherein R′ and R″ are hydrogen.

3. The compound of claim 2 wherein R is bornyl.

4. The compound of claim 2 wherein R is fenchyl.

5. The compound of claim 2 where R is 2,3,3-trimethyl-2-norcamphanyl.

References Cited

UNITED STATES PATENTS 3,318,920   5/1967   Meyer et al. _____ 260—564 X

ROBERT V. HINES, Primary Examiner

U.S. Cl. X.R.

260—501.14, 551, 563; 424—326

/ PO-1050
(5/69)

UNITED STATES PATENT OFFICE
CERTIFICATE OF CORRECTION

Patent No. 3,458,575                     Dated    July 29, 1969

Inventor(s)  Bola Vithal Shetty and Telfer L. Thomas

It is certified that error appears in the above-identified patent and that said Letters Patent are hereby corrected as shown below:

Claim 1, the structural formula should read:

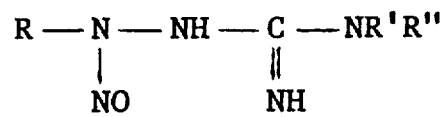

SIGNED AND
SEALED

NOV 25 1969

(SEAL)
Attest:

Edward M. Fletcher, Jr.
Attesting Officer

WILLIAM E. SCHUYLER, JR.
Commissioner of Patents